(12) United States Patent
Miura et al.

(10) Patent No.: US 10,971,888 B2
(45) Date of Patent: Apr. 6, 2021

(54) OPTICAL AMPLIFIER

(71) Applicant: Mitsubishi Electric Corporation, Chiyoda-ku (JP)

(72) Inventors: Hiroshi Miura, Tokyo (JP); Toshiyuki Tokura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 259 days.

(21) Appl. No.: 15/774,019

(22) PCT Filed: Nov. 19, 2015

(86) PCT No.: PCT/JP2015/082484
§ 371 (c)(1),
(2) Date: May 7, 2018

(87) PCT Pub. No.: WO2017/085822
PCT Pub. Date: May 26, 2017

(65) Prior Publication Data
US 2018/0358775 A1    Dec. 13, 2018

(51) Int. Cl.
*H01S 3/13*    (2006.01)
*H01S 3/067*    (2006.01)
(Continued)

(52) U.S. Cl.
CPC ........ *H01S 3/1305* (2013.01); *H01S 3/06754* (2013.01); *H01S 3/0941* (2013.01);
(Continued)

(58) Field of Classification Search
CPC ............................ H01S 3/1305; H01S 2301/04
See application file for complete search history.

(56) References Cited

U.S. PATENT DOCUMENTS 6,359,726 B1    3/2002  Onaka et al.
6,456,428 B1 *  9/2002  Nakaji ............... H01S 3/06754
                                                              359/341.41
(Continued)

FOREIGN PATENT DOCUMENTS

JP    2000-252923 A    9/2000
JP     3306700 B2      5/2002
(Continued)

OTHER PUBLICATIONS

International Search Report dated Feb. 9, 2016 in PCT/JP2015/082484US, filed on Nov. 19, 2015.
(Continued)

*Primary Examiner* — Eric L Bolda
(74) *Attorney, Agent, or Firm* — Oblon, McClelland, Maier & Neustadt, L.L.P.

(57) ABSTRACT

An optical amplifier which can suppress, without measuring signal beam power at individual wavelengths, wavelength-dependence of gain with respect to a signal beam into which multiple signal beams having respective wavelengths different from each other are multiplexed. The optical amplifier can suppress wavelength-dependence of gain by giving loss in accordance with a linear-loss slope to an amplified signal beam. The optical amplifier includes a variable tilt equalizer for varying a loss slope value representing the slope of the loss slope and a tilt control unit for controlling a loss slope value of the variable tilt equalizer.

8 Claims, 12 Drawing Sheets

(51) Int. Cl.
*H01S 3/10* (2006.01)
*H01S 3/0941* (2006.01)
*H01S 3/131* (2006.01)
*H01S 3/094* (2006.01)
*H01S 3/00* (2006.01)
*H01S 3/16* (2006.01)
*H04J 14/02* (2006.01)
*H04B 10/294* (2013.01)

(52) U.S. Cl.
CPC ........ *H01S 3/1003* (2013.01); *H01S 3/10015* (2013.01); *H01S 3/1301* (2013.01); *H01S 3/1312* (2013.01); *H01S 3/13013* (2019.08); *H01S 3/1608* (2013.01); *H04B 10/294* (2013.01); *H04J 14/0221* (2013.01); *H01S 3/0078* (2013.01); *H01S 3/06758* (2013.01); *H01S 3/09415* (2013.01); *H01S 3/094003* (2013.01); *H01S 3/094011* (2013.01); *H01S 3/10069* (2013.01); *H01S 2301/04* (2013.01)

(56) References Cited

U.S. PATENT DOCUMENTS

| | | | | |
|---|---|---|---|---|
| 6,483,631 | B1* | 11/2002 | Cheng | H04B 10/2941 359/337.11 |
| 6,535,329 | B1* | 3/2003 | Pelard | H01S 3/10013 359/337 |
| 6,535,330 | B1* | 3/2003 | Lelic | H04B 10/2941 359/337 |
| 6,731,424 | B1* | 5/2004 | Wu | H01S 5/50 359/337.1 |
| 6,879,437 | B2 | 4/2005 | Sandell et al. | |
| 2002/0041432 | A1 | 4/2002 | Onaka et al. | |
| 2002/0159135 | A1 | 10/2002 | Kelkar et al. | |
| 2003/0053196 | A1 | 3/2003 | Lelic et al. | |
| 2003/0086152 | A1 | 5/2003 | Wigley et al. | |
| 2003/0147125 | A1 | 8/2003 | Sandell et al. | |
| 2003/0190166 | A1* | 10/2003 | Sekine | H04B 10/0775 398/97 |
| 2005/0052731 | A1 | 3/2005 | Corr et al. | |
| 2005/0225843 | A1* | 10/2005 | Sugaya | H01S 3/06758 359/337.1 |
| 2009/0201576 | A1* | 8/2009 | Bolshtyansky | H01S 3/06754 359/341.33 |
| 2012/0188631 | A1* | 7/2012 | Shukunami | H04B 10/2941 359/337.1 |

FOREIGN PATENT DOCUMENTS

| | | |
|---|---|---|
| JP | 2003-526215 A | 9/2003 |
| JP | 3551418 B2 | 8/2004 |
| JP | 2006-108499 A | 4/2006 |
| JP | 2006-286918 A | 10/2006 |

OTHER PUBLICATIONS

Combined Chinese Office Action and Search Report dated Sep. 4, 2019 in Chinese Patent Application No. 2015800084532.0 (with unedited computer generated English Translation), 10 pages.

Office Action dated Oct. 30, 2018 in corresponding Japanese Patent Application No. 2017-551453 (with English Translation), 7 pages.

Extended European Search Report dated Oct. 29, 2018 in Patent Application No. 15908762.6, citing documents AA, AB, AC, AD, and AO therein, 10 pages.

Office Action dated Jun. 18, 2019 in Japanese Patent Application No. 2017-551453, 4 pages (with unedited computer generated English translation).

Chinese Office Action dated Sep. 3, 2020 in Patent Application No. 201580084532.0 (with English translation), 14 pages.

Chinese Office Action dated May 13, 2020 in Patent Application No. 201580084532.0 (with English translation), 10 pages.

European Office Action dated Apr. 20, 2020 in Patent Application No. 15 908 762.6, 9 pages.

* cited by examiner

OPTICAL AMPLIFIER

TECHNICAL FIELD

The present invention relates to an optical amplifier used for optical wavelength-multiplexing communication.

BACKGROUND ART

With global expansion of high-capacity network services, optical wavelength-multiplexing communication systems are becoming further widespread. In an optical wavelength-multiplexing communication system which transmits a signal beam having multiple wavelengths in a single optical fiber, an optical amplifier is used in order to compensate signal beam power reduced clue to long-distance and multi-span transmission.

In such an optical amplifier, an erbium-doped fiber (EDF) is normally used, through which the multiple-wavelength signal beam is propagated, and which is irradiated with excitation light to collectively amplify multiple signal beams.

Optical add-drop multiplexers (OADM) to diverge or insert a signal beam on a per-wavelength basis are introduced, which results in a complicated network. In a case in which a failure occurs at a specific transmission interval in a network where different wavelengths are multiplexed and transmitted through different transmission paths by the divergence or insertion, some of the wavelengths are lost in downstream transmission intervals and other wavelengths remain, which varies the number of multiplexed wavelengths. Even in the case, it is preferable that the transmission characteristics of the remaining signal beams are not affected. In order to achieve this, it is necessary to keep signal beam power per wavelength constant so that variation in the number of wavelengths will not affect the remaining signal beam power. From that point of view, a method to control to keep gains constant is widely used in optical amplifiers. By using the method to keep constant the signal beam power of each wavelength, the influence of the failure can be prevented from spreading into no-failure transmission intervals.

However, because the multiple-wavelength signal beam is collectively amplified, gain variation causes wavelength-dependence of gain, i.e. signal beam gain deviations at respective wavelengths. The gain's wavelength-dependence has been a cause of signal beam degradation.

As a technique to suppress the above-mentioned gain's wavelength-dependence, a technique is disclosed (for example, refer to Patent Document 1) in which signal beam power is measured at individual wavelengths by using an optical channel monitor (OCM) and the gain's wavelength-dependence is suppressed by using a signal beam power control device which can change the signal beam power of the individual wavelength components.

PRIOR ART DOCUMENT

Patent Document

Patent Document 1: Japanese Patent Laid-Open Publication No. 2006-286918

SUMMARY OF THE INVENTION

Problems to be Solved by the Invention

In a conventional optical amplifier, in order to suppress the gain's wavelength-dependence, a complex component such as an OCM to measure signal beam power at individual wavelengths is needed, causing a problem in that the configuration of the optical amplifier becomes more complex.

The present invention is devised to solve the problem mentioned above and to provide an optical amplifier which can suppress the gain's wavelength-dependence even with its simple configuration.

Means to for Solving the Problem

An optical amplifier includes: a beam input unit to receive an input signal beam into which multiple signal beams having respective wavelengths different from each other are multiplexed; a first beam amplification unit to amplify the input signal beam and to output the amplified input signal beam as an amplified signal beam; a beam output unit to output the amplified signal; a variable tilt equalizer which is provided between the first beam amplification unit and the beam output unit and gives loss to the amplified signal beam in accordance with a linear-loss slope, the variable tilt equalizer varying a loss slope value being a value of the linear-loss slope; a first photodetector to measure input signal beam power at the beam input unit; an excitation light source to excite the first beam amplification unit; a second photodetector to measure output signal beam power outputted by the variable tilt equalizer; a first control unit to control the excitation light source on the basis of the input signal beam power and the output signal beam power; and a second control unit to control the loss slope value of the variable tilt equalizer.

Effects of the Invention

An optical amplifier can be obtained which can suppress, in a case where its gain is fluctuated, wavelength-dependence of the gain without measuring signal beam power at individual wavelengths.

EMBODIMENTS FOR CARRYING OUT THE INVENTION

Embodiment 1

Figure 1:
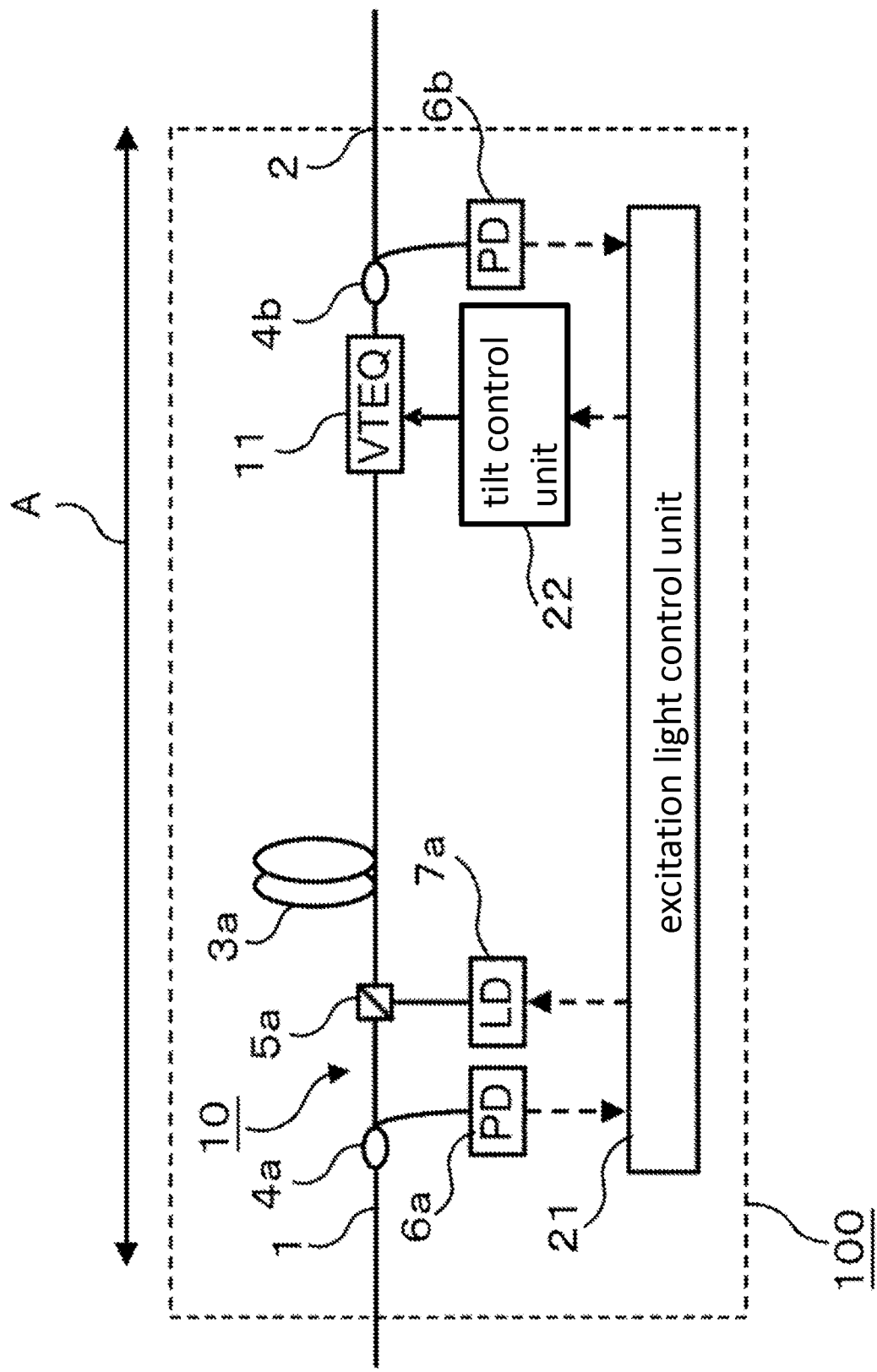
FIG. 1 is a configuration diagram of an optical amplifier according to Embodiment 1.

FIG. 1 is a configuration diagram of an optical amplifier 100 according to Embodiment 1. In FIG. 1, the optical amplifier 100 includes a signal beam propagation path 10 including a beam amplification unit to amplify an inputted signal beam; multiple optical components including a light source element and a light receiving element; and control units to control the components of the optical amplifier 100.

First, explanation will be made about each of the components provided to the signal beam propagation path 10. The signal beam propagation path 10 is a transmission path to propagate a signal beam from a beam input unit 1 toward a beam output unit 2 and amplify the signal beam. In the signal beam propagation path 10, an optical splitter 4a is provided near the beam input unit 1 to split the signal beam at the beam input unit 1, and an optical splitter 4b is provided near the beam output unit 2 to split the signal beam at the beam output unit 2. Also, an EDF 3a serving as a first beam amplification unit in the signal beam propagation path 10 is provided between the optical splitters 4a and 4b to amplify the inputted signal beam. In the signal beam propagation path 10, a variable tilt equalizer (VTEQ) 11 is provided between the EDF 3a and the optical splitter 4b, and a wavelength-selective optical coupler 5a serving as a first optical coupling unit is further provided between the optical splitter 4a and the EDF 3a.

In the following description, an interval between the beam input unit 1 and the beam output unit 2 is called interval A (indicated by a solid double arrow line).

A signal beam is inputted as an input signal beam, to the beam input unit 1. The input signal beam is a signal beam to which multiple signal beams having respective wavelengths different from each other are multiplexed. The beam output unit 2 outputs a signal beam amplified at the EDF 3a, as an output signal beam. The optical splitters 4a and 4b split a portion of the signal beam passing through the signal beam propagation path 10. The wavelength-selective optical coupler 5a combines a beam only in a specific wavelength band. The VTEQ 11 suppresses the wavelength-dependence of the gain in the EDF 3a.

The VTEQ 11 is a component which gives signal beam power loss at individual wavelengths according to a linear loss slope. For example, a current-control type element using magneto-optical effect or a temperature-control type planar lightwave circuit (PLC) can be used for the component.

Next, explanation will be made about each of the multiple optical elements provided to the optical amplifier 100. A photodiode (PD) 6a serving as a first photodetector is connected to the signal beam propagation path 10 via the optical splitter 4a. Also, the PD 6a serving as a light receiving element measures input signal beam power inputted at the beam input unit 1. Similarly, a PD 6b serving as a second photodetector is connected to the signal beam propagation path 10 via the optical splitter 4b. The PD 6b measures output signal beam power outputted at the beam output unit 2. A laser diode (LD) 7a serving an excitation light source is connected to the signal beam propagation path 10 via the wavelength-selective optical coupler 5a. The LD 7a irradiates the EDF 3a with specific-wavelength light to amplify the inputted signal beam. For EDF excitation light, light with 980 nm or 1480 nm wavelength is generally used. As an impurity-doped optical fiber, an optical fiber may be used that is doped with another rare earth element such as thulium, as a replacement of erbium.

Next, explanation will be made about control units to control the components of the optical amplifier 100. The optical amplifier 100 includes an excitation light control unit 21 as a first control unit, and a tilt control unit 22 as a second control unit. The excitation light control unit 21 obtains the input signal beam power measured by the PD 6a and the output signal beam power measured by the PD 6b to compare the input signal beam power with the output signal beam power and calculates the operating gain. The excitation light control unit 21 controls the excitation light intensity of the LD 7a so that the operating gain will take a value within a predetermined range against an externally-set target gain. In other words, the excitation light control unit 21 controls so that the operating gain, which is an average gain in interval A, will become close to the target gain G1. Here, in a signal beam into which signal beams having multiple wavelengths are multiplexed, the average gain does not mean gains at individual wavelengths, but means a gain with respect to the whole signal beam.

The tilt control unit 22 controls the VTEQ 11 so as to suppress the wavelength-dependence in the amplified signal beam using the target gain inputted from the excitation light control unit 21.

Next, the operation of the excitation light control unit 21 will be explained in concrete terms. Now, let the input signal beam power measured by the PD 6a be Pi and the output signal beam power measured by the PD 6b be Po. Then, the operating gain can be calculated by using Formula 1, and the calculated operating gain and the target gain are compared. Here, the excitation light intensity of the LD 7a is controlled so that the difference between the operating gain and the target gain will be within a setting range.

$$\text{Operating gain (dB)} = 10 \, \text{Log}(Po/Pi) \quad \text{(Formula 1)}$$

For example, when the operating gain is larger than the target gain, the LD 7a is controlled so as to lower its excitation light intensity in order to decrease the operating gain. As the result, the output signal beam power Po decreases. When the operating gain, on the contrary, is smaller than the target gain, the LD 7a is controlled so as to raise its excitation light intensity. As the result, the output signal beam power Po increases.

When an EDF is used as an optical fiber for amplification, it is general that the wavelength-dependence of the gain is almost linear in a narrow wavelength range and has linear characteristics. In the following explanation, a part of the gain's wavelength-dependence which is almost linear is defined as a gain slope.

Figure 2:
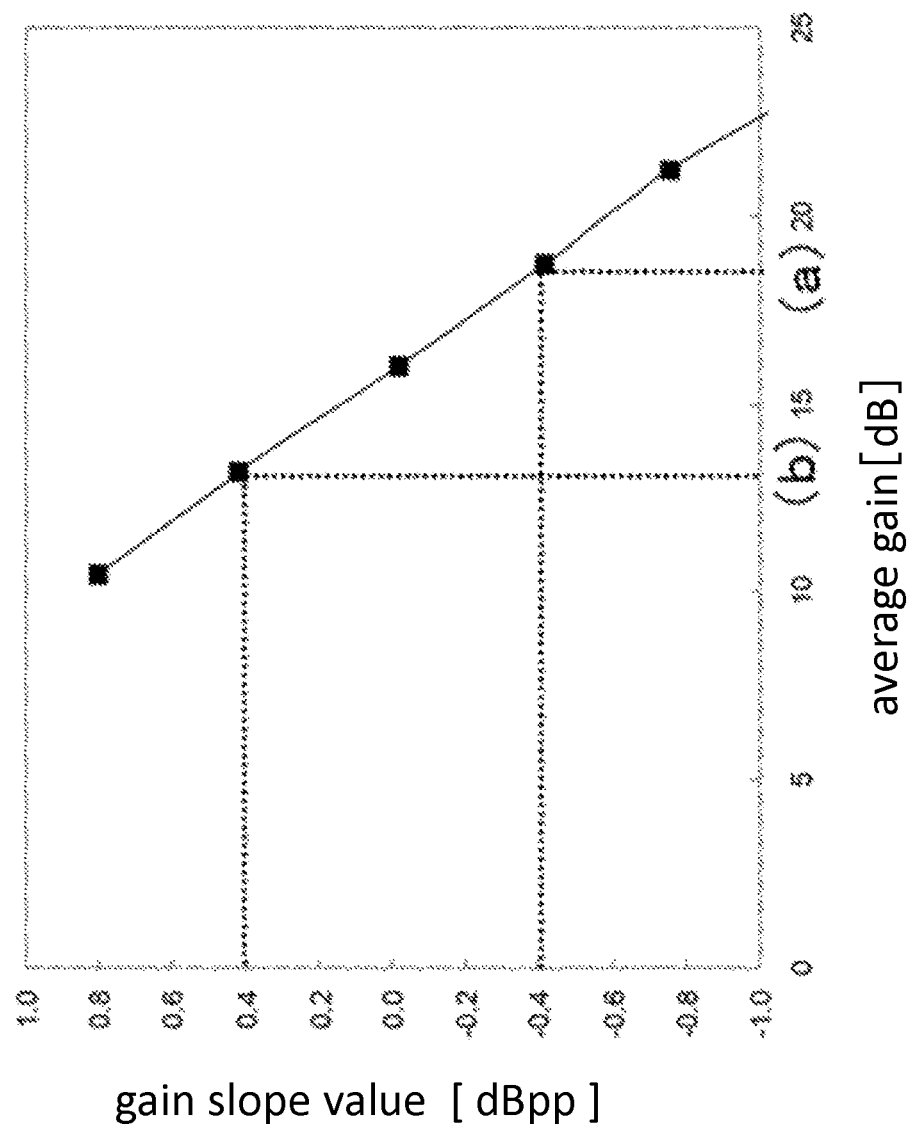
FIG. 2 is an example of a measurement graph showing a gain slope characteristic when an EDF is used.

FIG. 2 is an example of a measurement graph indicating a gain slope characteristic when the EDF 3a is used. In FIG. 2, the horizontal axis represents the average gain [dB] and the vertical axis represents the gain slope value. In the following explanation, the gain slope value is defined as ((the gain at a longest wavelength)—(the gain at a shortest wavelength)), and the relation between the average gain and the gain slope value is defined as a gain slope characteristic.

Also, in the following, "gain" means an optical gain at each wavelength; and "target gain" or "operating gain" means an average gain of a signal beam. The former and the latter are distinguished in the following explanation.

For example, at (a) shown in FIG. 2, the average gain is 18 [dB] and the gain slope value is (−0.4)[dBpp]. Also, at (b)

shown in FIG. 2, the average gain is 13 [dB] and the gain slope value is 0.4 [dBpp]. This relation between the average gain and the gain slope value is measured in advance with respect to the EDF 3a to be used.

Next, explanation will be made about a method to measure the gain slope characteristic of the EDF 3a. The average gain is varied successively within a predetermined setting range of the average gain to obtain gain slope values corresponding to respective average gains, thereby deriving a gain slope characteristic as shown in FIG. 2. A data table generated by measuring the relation between the average gain and the gain slope value may be stored as the gain slope characteristic in advance in the tilt control unit 22. The gain slope characteristic may also be formulated as a one-valued function which expresses the gain slope value using the average gain.

Figure 3:
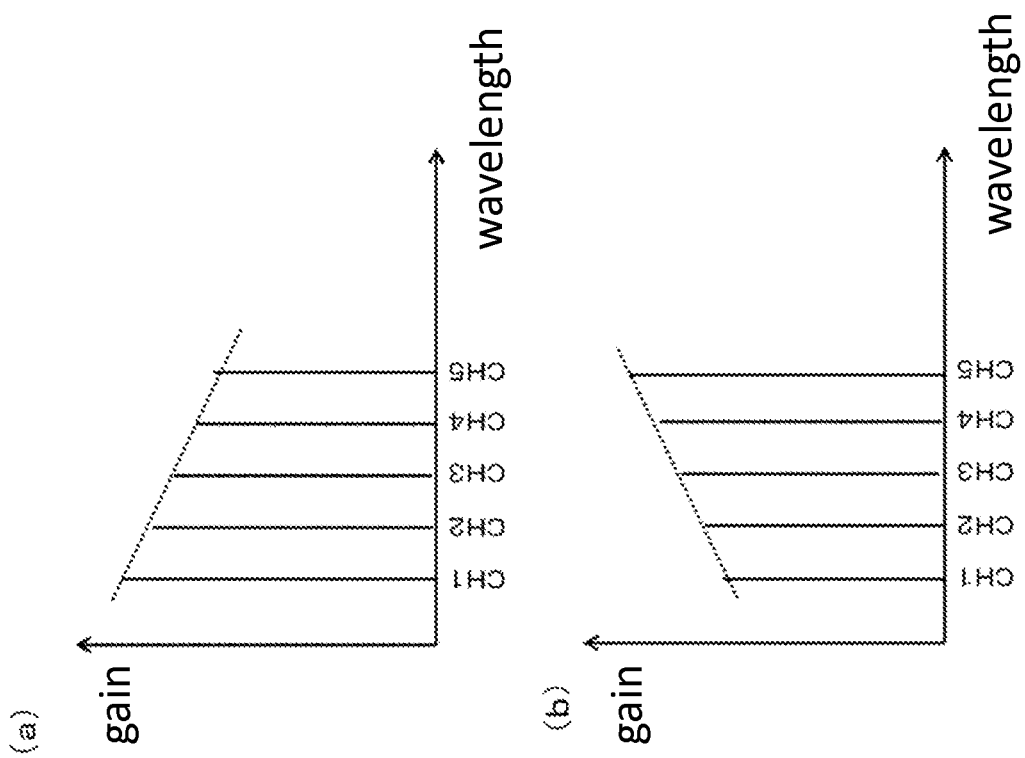
FIG. 3 are explanatory graphs each showing the gain slope of a signal beam containing multiple signal beams having respective wavelengths different from each other.

Explanation will be made about wavelength-dependence of the gain in a case where the excitation light intensity is varied. FIG. 3 are explanatory graphs each showing the gain slope of a signal beam containing multiple signal beams having respective wavelengths different from each other. The vertical axis represents the gain at each wavelength. The horizontal axis represents the wavelength of each of signal beams composing a signal beam. FIG. 3 each show gains of a signal beam having five different wavelengths of CH1 to CH5. Also, the gain slopes are shown as dotted lines. Although in the optical amplifier of the present invention, the gains at the respective wavelengths are not measured, the gains at the respective wavelengths will be used for explanation.

In the EDF 3a, wavelength-dependence of the gain occurs when the excitation light intensity is varied to vary the gain. To be more specific, in a case when the excitation light intensity is raised to increase the gain, gains are raised in a shorter wavelength side, so that the gain slope goes down to the right as shown in FIG. 3(a). Here, FIG. 3(a) corresponds to the case (a) in FIG. 2 and shows gain slopes at individual wavelengths, indicating that the gain slope value is (−0.4) [dBpp]. Also FIG. 3(b) corresponds to the case (b) in FIG. 2 and shows gain slopes, indicating that the gain slope value is (0.4) [dBpp]. On the other hand, in a case when the excitation light intensity is reduced to decrease the gain, gains are raised in a longer wavelength side, so that the gain slope goes up to the right as shown in FIG. 3(b).

Figure 4:
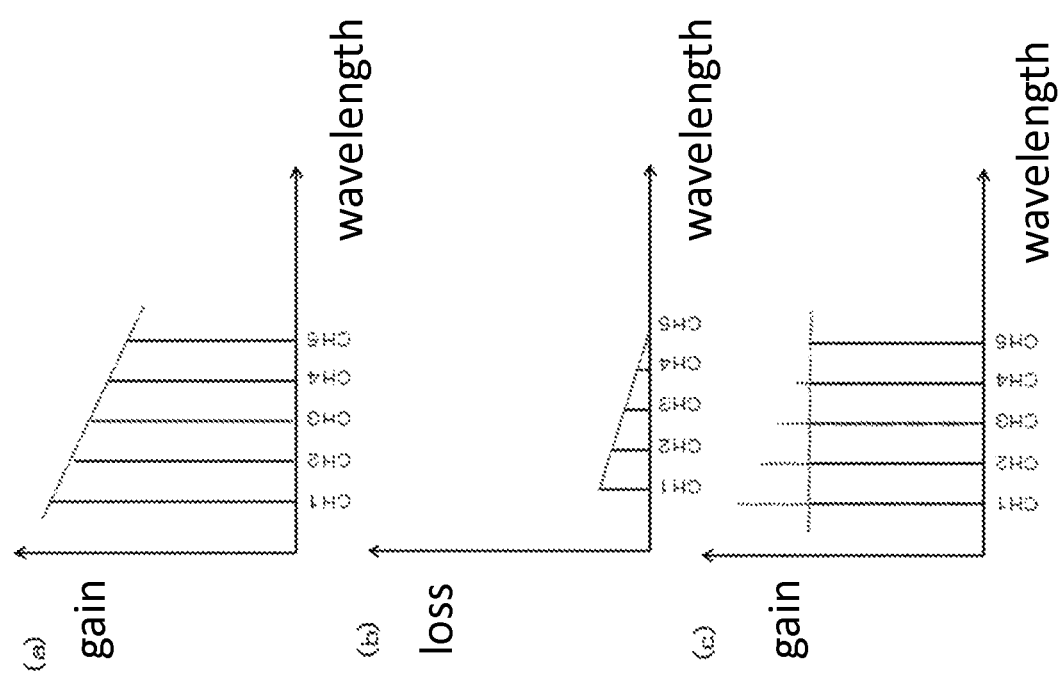
FIG. 4 are graphs for explaining a method to suppress a gain slope using a variable tilt equalizer.

Next, with reference to FIG. 2 to FIG. 4, detail explanation will be made about the control of the VTEQ 11 performed by the tilt control unit 22. FIG. 4 are graphs for explaining a method to suppress the gain slope indicated in FIG. 3(a). FIG. 4(a) is a graph showing the gains at respective wavelengths before applying the VTEQ 11. The vertical axis represents gains at respective wavelengths. The horizontal axis represents the wavelength of each of signal beams composing a signal beam. Also, a gain slope is represented by a dotted line. FIG. 4(b) is a graph showing a loss slope derived from a gain slope value. The horizontal axis represents the wavelength of the signal beam; the vertical axis represents the loss to be given to each of signal beams of respective wavelengths; and a dotted line indicates the loss slope. FIG. 4(c) is a graph showing gains at the respective wavelengths after applying the VTEQ 11. The vertical axis represents gains at respective wavelengths. The horizontal axis represents the wavelength of each of signal beams composing a signal beam. Also, a dotted line indicates a gain slope.

The tilt control unit 22 uses the gain slope characteristic shown in FIG. 2 to estimate a gain slope value corresponding to the target gain obtained from the excitation light control unit 21. That is to say, if the target gain is 18 [dB] as indicated at (a) of FIG. 2, the gain slope value can be estimated as (−0.4)[dBpp], whereby it can be estimated that the gain slope goes down to the right as shown in FIG. 4(a).

Next, the VTEQ 11 is controlled by the tilt control unit 22, so that the VTEQ 11 gives signal beams the losses according to the loss slope indicated in FIG. 4(b). Hereinafter, this line segment is referred to as a loss slope, and the slope of the line segment is defined as a loss slope value for explanation. Here, with respect to each of signal beams having respective wavelengths, the VTEQ 11 attenuates signal beam power by a loss amount corresponding to the loss slope of each wavelength. As the result, the gains at the respective wavelengths become flat. To be more specific in FIG. 4(b), a maximum loss is given to the gain at a shortest wavelength CH1 and a minimum loss is given to the gain at a longest wavelength CH5. Each of CH2 to CH4 is given a corresponding loss defined on a line segment passing a point corresponding to CH1 in FIG. 4(b) and a point corresponding to CH5 therein.

More specifically, the VTEQ 11 gives the signal beam, losses of the loss slope values each of which is a calculated gain slope value. From the viewpoint of maintaining signal beam power, the loss at CH5 should be preferably close to zero as shown in FIG. 4(b). However, even if the CH5 loss is larger than zero, any loss is acceptable as long as the loss slope is obtained from the loss slope value corresponding to the gain slope value and the gains at respective wavelengths are to be flattened. In above description, the loss gain slope value is defined as gain slope value; however, the correspondence relation between the loss slope and the gain slope may be expressed as a formula or the correspondence relation may be stored as a data table obtained by measuring.

As described above, by obtaining the loss slope from the gain slope and giving losses, it is possible to obtain a signal beam that has less wavelength-dependence of gain as shown FIG. 4(c). In FIG. 4, the case was described in which the gain slope goes down to the right; however it is also possible to suppress, using a similar method, wavelength-dependence of gain in a case in which the gain slope goes up to the right.

Instead of the target gain transmitted from the excitation light control unit 21, the tilt control unit 22 may use the operating gain to control the VTEQ 11. Even in a case where the operating gain differs from the target gain, the gain slope value can be obtained accurately by using the operating gain.

Instead of using the target gain or the operating gain, the LD 7a may be controlled so that the output signal beam power detected by the PD 6b will be within a setting range. In this case, the loss slope of the VTEQ 11 is adjusted according to the operating gain calculated from the input signal beam power using (Formula 1).

Note that a control time constant of the VTEQ 11 is set to be longer than a control time constant of the LD controlled by the excitation light control unit 21. It is because there is a limitation on a response speed when the loss slope of the VTEQ 11 is varied, and also because it is necessary to prevent failure in a stable convergence control, which is to be caused when the loss slope control competes with the control for varying the excitation light intensity of the LD.

As described, the optical amplifier 100 according to Embodiment 1 suppresses the gain slope by using the VTEQ 11; therefore, even with its simple configuration, the optical amplifier 100 can suppress the gain's wavelength-dependence.

Embodiment 2

Figure 5:
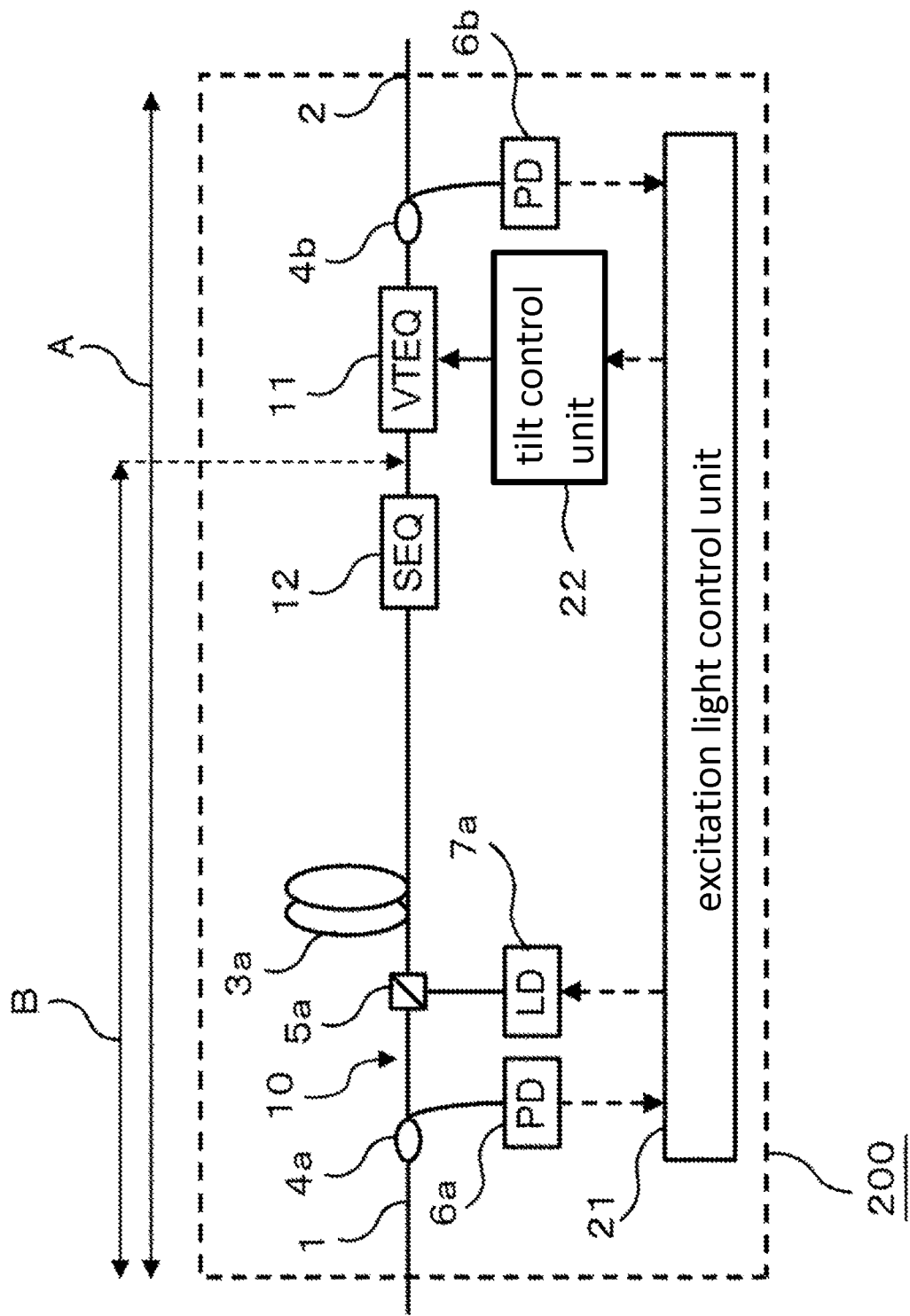
FIG. 5 is a configuration diagram of an optical amplifier according to Embodiment 2.

FIG. 5 is a configuration diagram of an optical amplifier 200 according to Embodiment 2. In the optical amplifier 200 according to Embodiment 2, in addition to the components shown in Embodiment 1, a shape equalizer (SEQ) 12 is newly provided between the EDF 3a and the VTEQ 11. Components which are the same as or correspond to those described in Embodiment 1 are given the same symbols to omit the description.

In FIG. 5, interval A indicated by a solid double arrow line is the same as that in FIG. 1. Interval B indicated by another solid double arrow line is an interval between the beam input unit 1 and a downward broken line arrow. The downward broken line arrow indicates a portion between an output end of the SEQ 12 and an input end of the VTEQ 11. Interval A and interval B will be used later when comparing the optical amplifier 200 according to the present embodiment with the conventional optical amplifier.

The SEQ 12 is a component which has a loss characteristic to correct a non-linear characteristic portions that the VTEQ 11 cannot correct in the wavelength-dependence of the amplified-signal beam gain and that, so as to make the wavelength-dependence be linear. Whereas the loss slope of the tilt equalizer 11 is variable, the SEQ 12 has an inherent loss characteristic.

Figure 6:
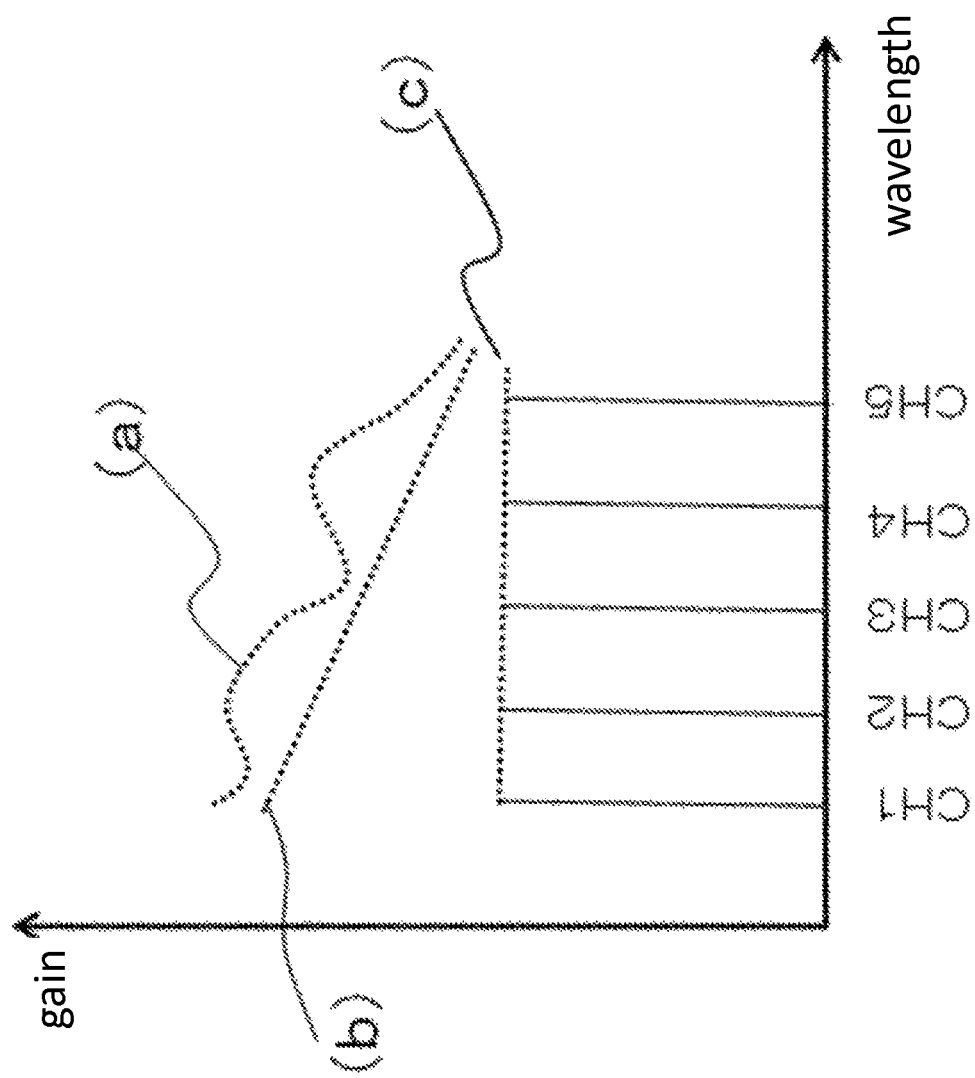
FIG. 6 is an explanatory graph showing a gain slope suppression method using a variable tilt equalizer and a shape equalizer.

FIG. 6 is an explanatory graph showing a gain slope suppression method using the VTEQ 11 and the SEQ 12. In FIG. 6, (a) indicates gains at respective wavelengths before the SEQ 12 is applied; (b) indicates gains at the respective wavelengths after the SEQ 12 is applied; and (c) indicates gains at the respective wavelengths after the SEQ 12 and the VTEQ 11 are applied.

First, the SEQ 12 corrects nonlinear portions of the gain's wavelength-dependence so that the gain slope will become almost linear. To be more specific, (a) which includes non-linear components is varied to (b) which is almost linear. Next, the VTEQ 11 decreases the gain slope as shown in (c) to make the gain slope flat.

For the SEQ 12, a diffraction grating such as a fiber grading, etalon filter, or dielectric multilayer filter is used.

In the optical amplifier 200 with such a configuration according to Embodiment 2, the VTEQ 11 suppresses the gain slope, and the non-linear components in the gain's wavelength-dependence are eliminated by the SEQ 12. Therefore, even if the gain's wavelength-dependence is not linear, the gain's wavelength-dependence can be suppressed.

Figure 7:
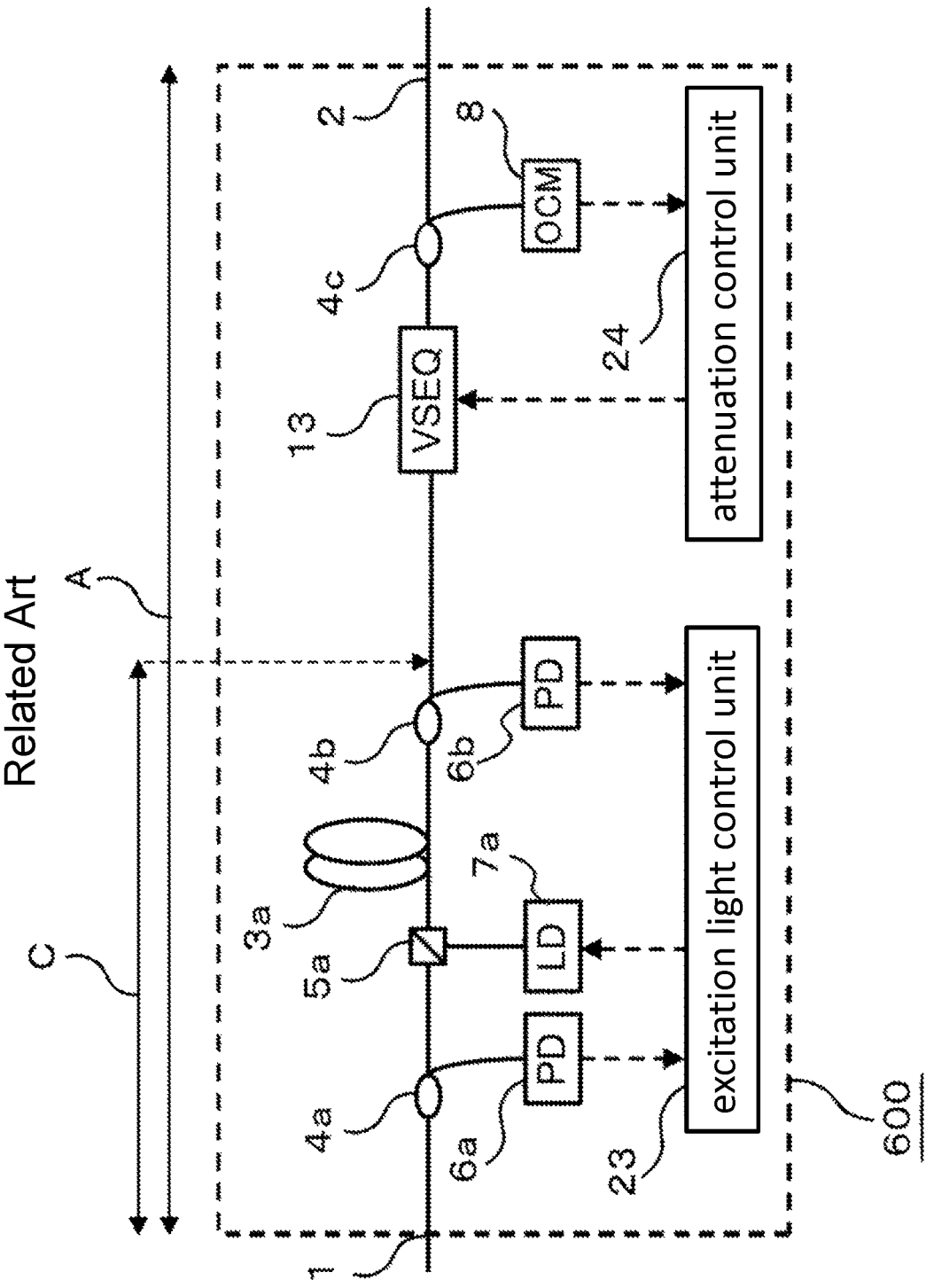
FIG. 7 is a configuration diagram of a conventional optical amplifier 600.

On the other hand, FIG. 7 is a configuration diagram showing a conventional optical amplifier 600. In FIG. 7, there is a difference in that a variable shape equalizer 13 (VSEQ) is provided instead of the VTEQ 11, and an optical splitter 4c and an OCM 8 are provided. Furthermore, there is also a difference in that the PD 6b is provided at a stage subsequent to the VTEQ 11 in the optical amplifier 200 according to Embodiment 2, whereas the PD 6b is arranged as a stage prior to the VSEQ 13 in the conventional optical amplifier 600. In the figure, a solid double arrow line A indicates an interval from the beam input unit 1 to the beam output unit 2. Also, a solid double arrow line C indicates an interval from the beam input unit 1 to an input end (shown by a downward broken line arrow in the figure) of the VSEQ 13.

An excitation light control unit 23 controls the LD 7a so that the average gain of the signal beam in interval C will become close to the target gain G1.

The signal beam is split by the optical splitter 4c and inputted to the OCM 8. The OCM 8 measures power of a wavelength-multiplexed signal beam at individual wavelengths. The VSEQ 13 makes adjustment so that power levels at the respective wavelengths of the signal beam outputted from the beam output unit 2 will become the same.

The attenuation control unit 24 controls the VSEQ 13 on the basis of the signal beam power levels obtained by the OCM 8 at the respective wavelengths so that each of the signal beam power levels at the respective wavelengths will become a same value.

The conventional optical amplifier 600 shown in FIG. 7 has a problem that in a case where the wavelength-dependence of the EDF gains causes gain deviations between wavelengths, the gain deviations cause gain fluctuation at each wavelength when the number of wavelengths varies. The problem will be explained below in detail.

Figure 8:
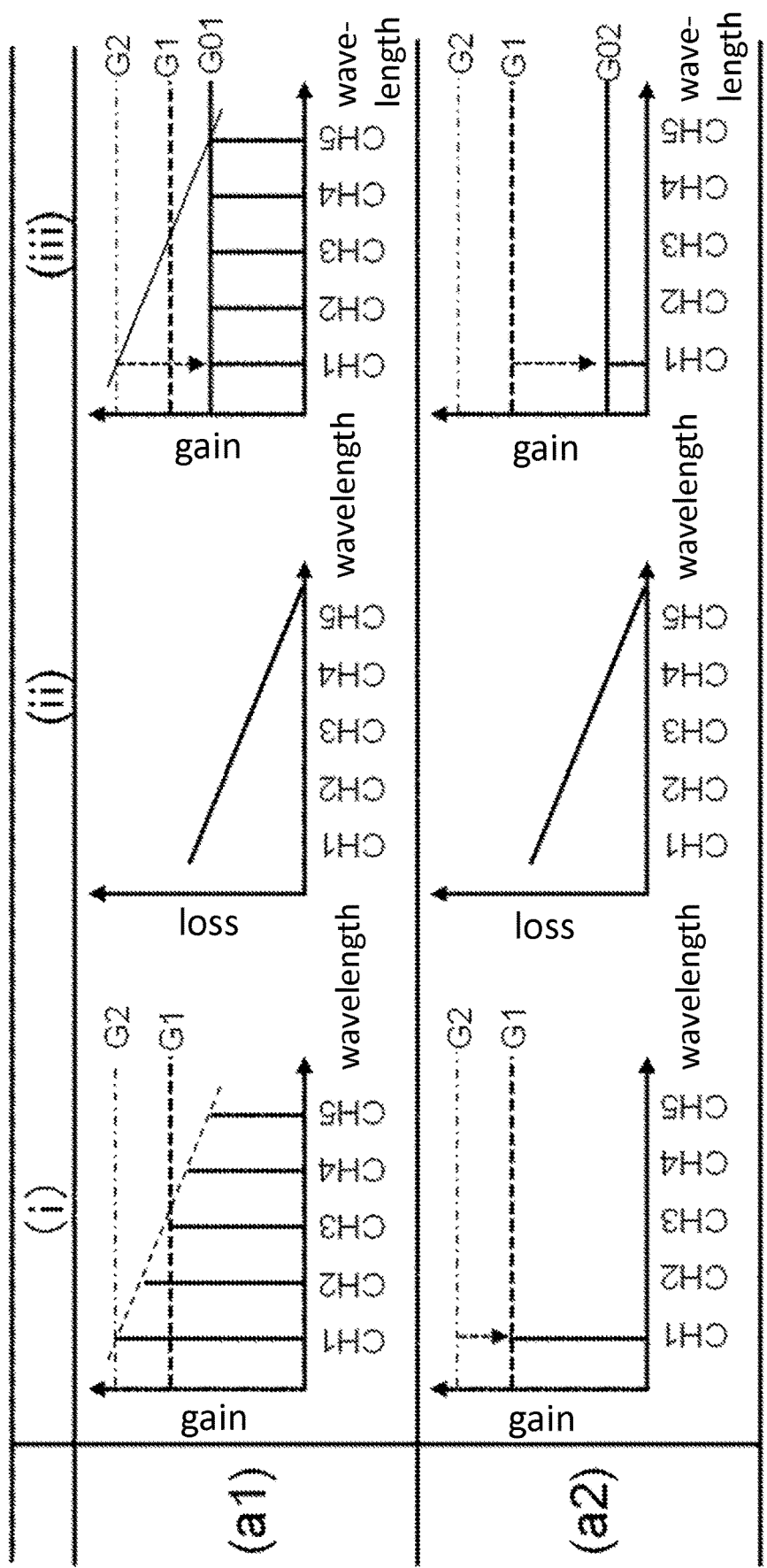
FIG. 8 includes explanatory graphs showing the control results when the conventional optical amplifier is used.

FIG. 8 includes explanatory graphs showing control results when the conventional optical amplifier 600 is used. In the figure, row (a1) shows a five-wavelength input state where a signal beam having five wavelengths of CH1 to CH5 is inputted; row (b1) shows a single-wavelength input state. Also, in the figure, column (i) indicates average gains in interval C (illustrated in FIG. 7) which is the interval between the beam input unit 1 and the VSEQ 13; column (ii) indicates losses which the VSEQ 13 gives to the signal beam. Also, column (iii) indicates average gains in interval A (illustrated in FIG. 7) which is the interval between the beam input unit 1 and the beam output unit 2. In the figure, horizontal broken lines indicate an externally-set target gain G1; and horizontal dash-dotted lines indicate G2 which is a gain of CH1 in interval C in the five-wavelength input state.

More detailed explanation will be made on row (a1) in FIG. 8. On the basis of the target gain G1, the excitation light control unit 23 controls the operating gain which is the average gain in interval C. Therefore, a graph in row (a1) of column (i) shows that the gain at CH3 almost agrees with the target gain G1. This is because, in the graph in FIG. 8, the gain at CH3 almost agrees with an average gain of all the five wavelengths CH1 to CH5 in the signal beam, and also the average gain in interval C is controlled so as to become close to the target gain G1. In this graph, the gain slope indicated from CH1 to CH5 goes down to the right; therefore, the gains at CH1 and CH2 are higher than the target gain G1, and the gains at CH4 and CH5 are lower than the target gain G1. Also, a graph in column (iii) shows a state where, after passing the VSEQ 13, the gains at CH1 to CH5 are the same specific value. Because the VSEQ 13 is a component for giving losses, an operating gain G01 which is an average gain in interval A in the five-wavelength input state becomes lower than the target gain G1.

Next, with reference to row (a1) and row (a2), explanation will be made about fluctuation of the average gain in interval A in a case where the input state has been switched from the five-wavelength input state to the single-wavelength input state. First, in the five-wavelength input state shown in row (a1) of column (i), the average gain of the whole signal beam agrees with the target gain G1. Due to the gain slope downward to the right, the gain at CH1 is higher than the target gain G1. On the other hand, in the single-wavelength input state shown in row (a2), the gain at CH1 is controlled so as to take the same value as the target gain G1. Therefore, as indicated by a solid downward arrow in the graph, the gain at CH1 decreases from G2. When the input state switches from the five-wavelength input state to the single-wavelength input state, the average gain in interval A, namely the operating gain, significantly decreases from G01 to G02 as shown in the graphs.

As described so far, the conventional optical amplifier 600 has a problem in that in a case where the number of wavelengths of the signal beam fluctuates, the operating gain significantly varies.

In this case, the gain reduction can be compensated through adjustment of the VSEQ 13. However, the control of the VSEQ 13 is generally performed slower than the constant gain control performed by the EDF. This is due to a response speed limitation about an attenuating component used in the VSEQ 13. For a reference, the response speed of the VSEQ 13 controlled by the attenuation control unit 24 is slow (a millisecond or more), and the response speed of the EDF 3a controlled by the excitation light control unit 23 is fast (a millisecond or less).

Therefore, until the VSEQ 13 completes adjustment, the operating gain remains in a varied state, namely in a state where the signal beam power is deviated from the target gain. In long-distance signal beam transmission, such deviation accumulates as the signal beam passes through a large number of optical amplifiers, causing degradation of communication quality. Consequently, in such an optical transmission system, a temporary degradation in communication quality is not acceptable; it is not acceptable that the communication quality is damaged until the VSEQ 13 completes adjustment.

Figure 9:
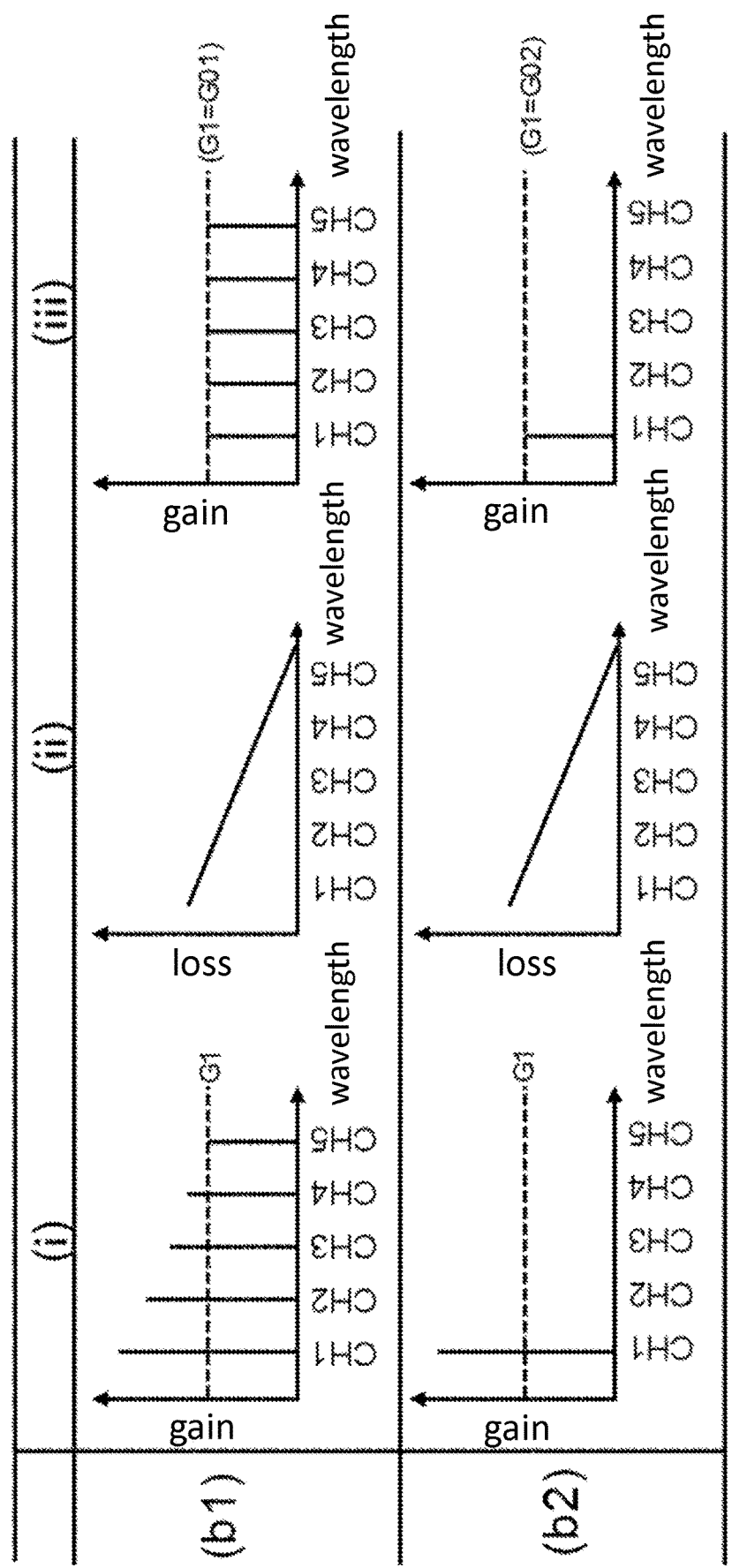
FIG. 9 includes explanatory graphs showing the control results when the optical amplifier according to Embodiment 2 of the present invention is used.

Now, with reference to FIGS. 8 and 9, comparison will be made between the conventional optical amplifier 600 and the optical amplifier 200 according to Embodiment 2. FIG. 9 includes explanatory graphs showing the control results when the optical amplifier 200 according to Embodiment 2 is used. Row (b1) shows a state where a signal beam having five wavelengths of CH1 to CH5 is inputted. Row (b2) shows a state where a signal beam having a single wavelength is inputted. Also, column (i) shows gains at CH1 to CH5 in interval B shown in FIG. 5. Column (ii) shows losses given by the VTEQ 11. Also, column (iii) shows gains at CH1 to CH5 in interval A shown in FIG. 5. In the figure, broken lines indicate an externally-et target gain G1.

With reference to FIG. 9, explanation will be made about the effect of the optical amplifier 200 according to Embodiment 2. In this optical amplifier, the signal beam power is measured at the output side of the VTEQ 11 to perform the constant gain control in interval A; therefore, an operating gain G01 being the average gain in interval A in the five-wavelength input state agrees with an operating gain G02 being the average gain in interval A in the single-wavelength input state.

Furthermore, as shown in column the operating gain G01 in interval A in the five-wavelength input state is the same as the operating gain G02 which is the average gain in the single-wavelength input state. That is, even when the number of wavelengths fluctuates, the average gain of the signal beam in interval A does not vary. This effect is achieved by a configuration which differs from that of the conventional optical amplifier 600 shown in FIG. 8 and in which the optical splitter 4b is provided not at the input side of the VTEQ 11 but at the output side thereof, and the PD 6b measures the signal beam power at the output side of the VTEQ 11.

As shown in columns (iii) of FIGS. 8 and 9, when the number of wavelengths in the signal beam varies from five to one, the optical amplifier 200 produces less fluctuation in the average gain in interval A than the conventional optical amplifier 600.

The optical amplifier 200 according to the present embodiment has a configuration in which the PD 6b for measuring the signal beam power is not arranged at the input side of the VTEQ 11 but is properly arranged at the output side thereof, and in which instead of the VSEQ 13 for uniforming signal beam power at each wavelength, the VTEQ 11 is used for making the respective gains equal between wavelengths. With such a configuration described above, even when the number of wavelengths fluctuates, the operating gain G01 in interval A in the five-wavelength input state varies little, from the operating gain G02 in the single-wavelength input state. That is to say, when the number of wavelengths fluctuates, a proper control can be performed in which the gain's wavelength-dependence is suppressed and the significant fluctuation of the operating gain is suppressed.

In the optical amplifier 200 according to the present embodiment, even when the number of wavelengths decreases, the communication quality can be maintained stable.

As described above, in the conventional optical amplifier 600, the constant gain control method and the method for suppressing gain deviation between wavelengths are introduced; therefore, the conventional optical amplifier 600 is generally at an acceptable level for a desired operation and performance. However, detailed analysis into the operation reveals that constant gain control with sufficiently high accuracy has not exactly been realized. The optical amplifier 200 according to Embodiment 2 of the present invention realizes a constant gain control with high accuracy on the basis of accurate analysis. Furthermore, even in a case where the gain's wavelength-dependence occurs, the optical amplifier 200 can maintain flatness in gains among respective wavelengths without using an excitation light source with excessively high output power and high cost, which thereby realizes a highly-accurate constant gain control.

In the optical amplifier 200, which differs from the conventional optical amplifier 600, the optical splitter 4b is properly arranged at the output side of the VTEQ 11 to perform constant gain control using the output-side signal beam power measured by the PD 6b and to make gains equal between different wavelengths of the signal beam instead of uniforming power at different wavelengths of the signal beam. This can perform proper control even in a case where the number of wavelengths fluctuates.

Embodiment 3

Figure 10:
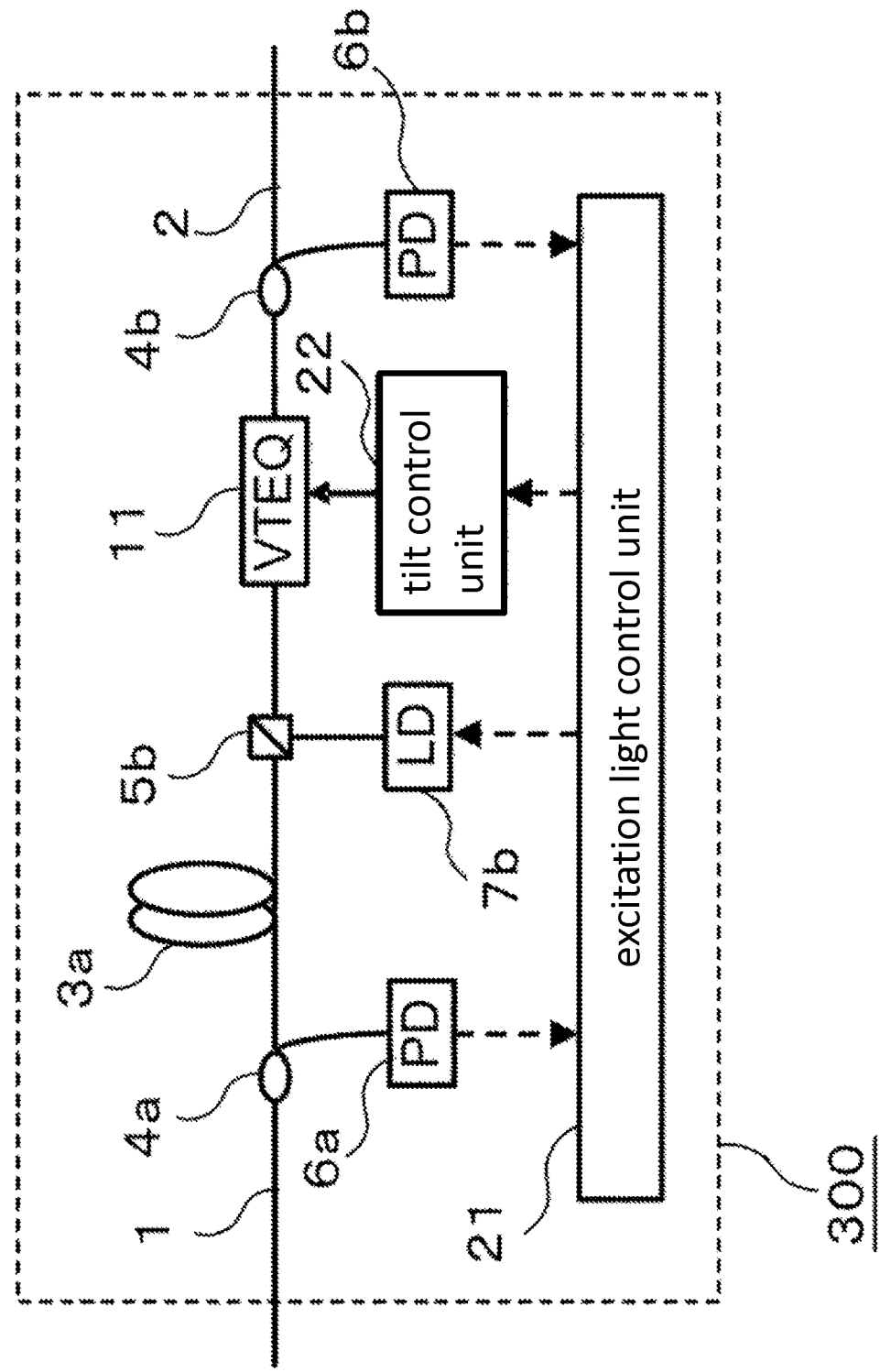
FIG. 10 is a configuration diagram of an optical amplifier according to Embodiment 3.

FIG. 10 is a configuration diagram of an optical amplifier 300 according to Embodiment 3. In comparison to the optical amplifier 100 according to Embodiment 1 in which the wavelength-selective optical coupler 5a and the LD 7a are provided at a stage prior to the EDF 3, the optical amplifier 300 according to Embodiment 3 is different in that a wavelength-selective optical coupler 5b serving as a second optical coupling unit and an LD 7b are provided at a stage subsequent to the EDF 3a. Here, the LD 7b excites the EDF 3a at the stage subsequent to the EDF 3a. In addition, it is needless to say that, similarly to Embodiment 2, the SEQ 12 may be provided between the wavelength-selective optical coupler 5b and the VTEQ 11.

By using a backward excitation configuration in which the excitation light is combined from the stage subsequent to the EDF 3a, degradation by noise develops more in comparison to the forward excitation configuration, but gain saturation in the signal beam becomes less likely to occur. That is to say, this can bring a higher output in comparison to the forward excitation in which the LD 5a is used to excite the EDF 3a from the stage prior thereto. In the figure, components which are the same as or correspond to those shown in FIG. 1 are given the same symbols and the description therefor will be omitted.

Embodiment 4

Figure 11:
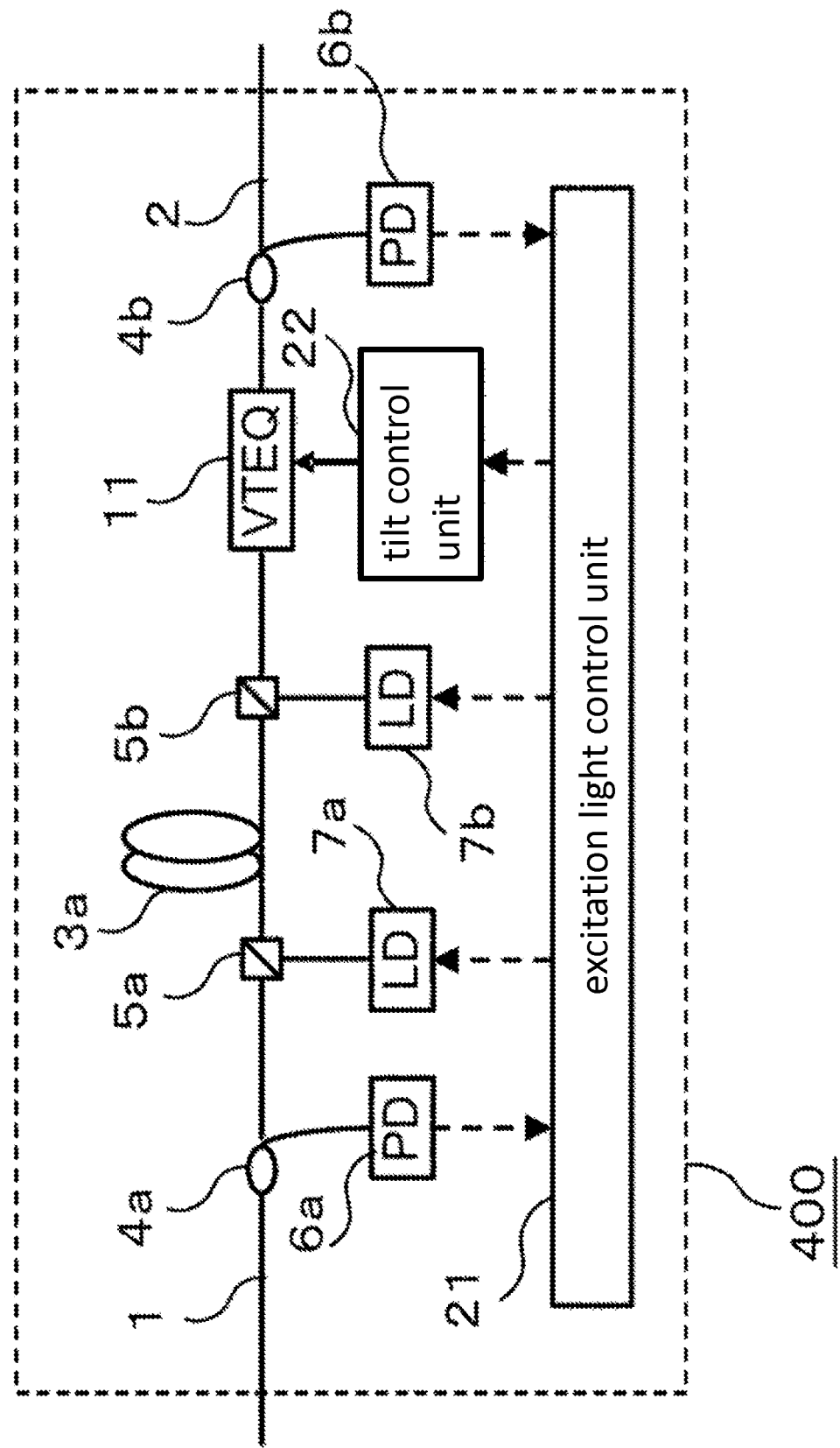
FIG. 11 is a configuration diagram of an optical amplifier according to Embodiment 4.

FIG. 11 is a configuration diagram of an optical amplifier 400 according to Embodiment 4. In addition to the configuration of the optical amplifier 100 according to Embodiment 1, an LD 7b as an excitation light source and a wavelength-selective optical coupler 5b are further provided at a stage subsequent to the EDF 3a. The EDF 3a is excited from both of the prior and subsequent stages. This leads to uniform excitation across the whole length of the EDF 3a. It is needless to say that, similarly to Embodiment 2, a SEQ 12 may be provided between the wavelength-selective optical coupler 5b and the VTEQ 11. In the figure, components which are the same as or correspond to those shown in FIG. 1 are given the same symbols and the description therefor will be omitted.

Embodiment 5

Figure 12:
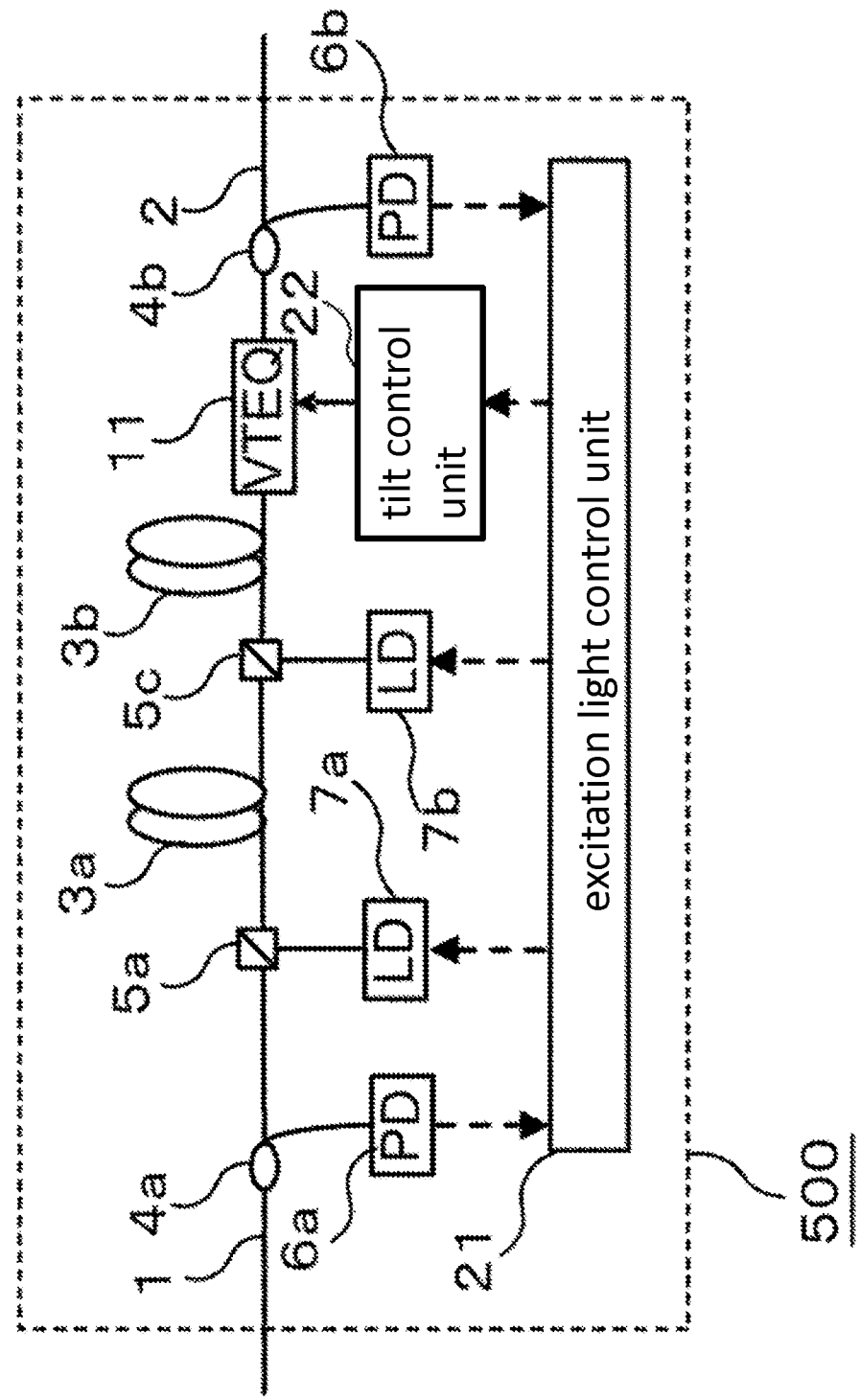
FIG. 12 is a configuration diagram of an optical amplifier according to Embodiment 5.

FIG. 12 is a configuration diagram of an optical amplifier 500 according to Embodiment 5. In comparison to the optical amplifier 400 according to Embodiment 4, the optical amplifier 500 according to Embodiment 5 is different in that an EDF 3b serving as a second beam amplification unit is further provided at a stage prior to the VTEQ 11, and instead of the wavelength-selective optical coupler 5b, a wavelength-selective optical coupler 5c serving as a third optical coupling unit is provided between the EDFs 3a and 3b. In this configuration, the LD 7b performs forward excitation of the EDF 3b through the wavelength-selective optical coupler 5c. In addition, it is needless to say that, similarly to Embodiment 2, a SEQ 12 may be provided between the wavelength-selective optical coupler 5c and the VTEQ 11. In the figure, components which are the same as or correspond to those shown in FIG. 11 are given the same symbols and the description will be omitted.

Although the present invention uses configurations in which VTEQs are used for suppressing the wavelength-dependence of EDFs, there is a generally-known approach in which the VTEQs are not used and the gain of the EDF is fixed to a specific value that produces no wavelength-dependence. However, even when the gain value at which no wavelength-dependence occurs is larger than the required gain, the EDF is to be initially excited so that the gain will have no wavelength-dependence, and then, attenuated down to the required gain. This configuration requires a high-output and expensive excitation light source, making the optical amplifier more expensive and excessively power-consuming.

Also, in the present invention, the input signal beam power of the optical amplifier and the output signal beam power thereof are measured and the excitation light intensity of the excitation light source is controlled so that the optical amplifier gain will become equal to the target gain. On the other hand, there is an approach in which the amplified-signal beam power is measured right after the beam amplification unit, so that the excitation light intensity of excitation light source is controlled using the input signal beam power and the amplified-signal beam power, and then the gain's wavelength-dependence is suppressed. However, in this case, the suppression of the gain's wavelength-dependence causes attenuation of the signal beam, making the optical amplifier gain lowered than the target gain.

Also, by comparing the conventional optical amplifier 600 and the optical amplifier 200 according to Embodiment 2 of the present invention, it has been explained that the optical amplifier of the present invention can suppress the fluctuation of the gain more effectively than the conventional optical amplifier and, even when the number of the wavelengths decreases, the communication quality can be maintained stable. It is needless to say that this effect can be achieved not only with the configuration of Embodiment 2, but also with any configuration described in Embodiment 1 or Embodiments 3 to 5 of the present invention.

In addition to the configurations shown in Embodiments 1 to 5 described above, any configuration produced by combining these embodiments may be used. Also, it is needless to say that a configuration obtained by combining the embodiments may be properly modified to configure an optical amplifier.

DESCRIPTION OF SYMBOLS

1: beam input unit
2: beam output unit
3a, 3b: EDF (erbium-doped fiber)
5a, 5b, 5c: wavelength-selective optical coupler
6a, 6b: PD (photodiode)
7a, 7b: LD (laser diode)
10: signal beam propagation path
11: VTEQ (variable tilt equalizer)
12: SEQ (shape equalizer)
21: excitation light control unit
22: tilt control unit

The invention claimed is:
1. An optical amplifier comprising:
a beam input unit to receive an input signal beam into which multiple signal beams having respective wavelengths different from each other are multiplexed;
a first beam amplifier to amplify the input signal beam and to output the amplified input signal beam as an amplified signal beam;
a beam output unit to output the amplified signal beam;
a variable tilt equalizer which is provided between the first beam amplifier and the beam output unit and which gives loss to the amplified signal beam in accordance with a linear-loss slope, the variable tilt equalizer varying a loss slope value which is a value of the linear-loss slope;
a first optical splitter provided between the beam input unit and the first beam amplifier;
a first photodetector to measure input signal beam power at the beam input unit via the first optical splitter;
an excitation light source to excite the first beam amplifier;
a second optical splitter provided between the variable tilt equalizer and the beam output unit;
a second photodetector to measure output signal beam power output from the variable tilt equalizer via the second optical splitter;
a first controller to control the excitation light source on the basis of the input signal beam power and the output signal beam power; and
a second controller to control the loss slope value of the variable tilt equalizer,
wherein the first controller obtains an operating gain on the basis of the input signal beam power and the output signal beam power, and controls the excitation light source so that the operating gain becomes close to a target gain set in advance, and
wherein on the basis of the operating gain and a calculated characteristic of gain slope representing wavelength-dependence of gain in the first beam amplifier, the second controller calculates a gain slope value being a value of the gain slope, and controls the variable tilt equalizer by using the gain slope value as the loss slope value.

2. The optical amplifier according to claim 1, further comprising a shape equalizer provided between the first beam amplifier and the variable tilt equalizer, the shape equalizer having a loss characteristic to correct the spectral gain slope into a linear characteristic.

3. The optical amplifier according to claim 1, further comprising a first optical coupler provided between the beam input unit and the first beam amplifier, wherein the excitation light source excites the first beam amplifier through the first optical coupler.

4. The optical amplifier according to claim 1, further comprising a second optical coupler provided between the first beam amplifier and the variable tilt equalizer, wherein the excitation light source excites the first beam amplifier through the second optical coupler.

5. The optical amplifier according to claim 1 further comprising
a first optical coupler provided between the beam input unit and the first beam amplifier and
a second optical coupler provided between the first beam amplifier and the variable tilt equalizer,
wherein the excitation light source excites the first beam amplifier through the first optical coupler and the second optical coupler.

6. The optical amplifier according to claim 1, further comprising:
a first optical coupler provided between the beam input unit and the first beam amplifier;
a third optical coupler provided between the first beam amplifier and the variable tilt equalizer; and
a second beam amplifier provided between the third optical coupler and the variable tilt equalizer,
wherein the excitation light source excites the first beam amplifier through the first optical coupler and excites the second beam amplifier through the third optical coupler.

7. The optical amplifier according to claim 1, wherein a control cycle of the first controller is shorter than a control cycle of the second controller.

8. The optical amplifier according to claim 1, wherein the first beam amplifier is an erbium-doped fiber.

* * * * *